(12) United States Patent
Xavier et al.

(10) Patent No.: US 7,975,297 B2
(45) Date of Patent: Jul. 5, 2011

(54) ANTI-PHISHING PROTECTION

(75) Inventors: Joseph Xavier, Seattle, WA (US); Aime M. Mitchell, Seattle, WA (US); Brian J. Tsang, Redmond, WA (US); George A. Herbert, Kirkland, WA (US); Hernan I. Savastano, Seattle, WA (US); Lubdha Khandelwal, Redmond, WA (US); Robert C. J. Pengelly, Seattle, WA (US); Robert Novitskey, Redmond, WA (US); Stanley Grant, III, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1450 days.

(21) Appl. No.: 11/205,584

(22) Filed: Aug. 16, 2005

(65) Prior Publication Data

US 2007/0044149 A1  Feb. 22, 2007

(51) Int. Cl.
*G06F 11/00* (2006.01)
(52) U.S. Cl. .............................. 726/22; 726/23; 726/25
(58) Field of Classification Search ................ 726/22, 726/25, 23
See application file for complete search history.

(56) References Cited

U.S. PATENT DOCUMENTS

| | | | |
|---|---|---|---|
| 6,356,937 B1 | 3/2002 | Montville et al. | 709/206 |
| 2003/0070101 A1 | 4/2003 | Buscemi | 713/202 |
| 2004/0064515 A1 | 4/2004 | Hockey | 709/206 |
| 2004/0249747 A1 | 12/2004 | Ramian | 705/39 |
| 2005/0021476 A1 | 1/2005 | Candella et al. | 705/64 |
| 2005/0086161 A1 | 4/2005 | Gallant | 705/39 |
| 2005/0097177 A1 | 5/2005 | McUmber et al. | 709/206 |

FOREIGN PATENT DOCUMENTS

| | | |
|---|---|---|
| KR | 10-2004-0070111 | 6/2004 |
| KR | 10-2005-0002712 | 10/2005 |
| KR | 10-2005-0044070 | 12/2005 |
| WO | WO 2005/027016 A2 | 3/2005 |
| WO | WO 2005/031518 A2 | 4/2005 |

OTHER PUBLICATIONS

Phishing Sweeper Enterprise; description of the May 6, 2005 version of Phishing Sweeper Enterprise, printed out in 2009.*
Program URL ; a listing of Anti-Phishing Software and their release dates, as printed out in 2009.*
WholeSecurity; nternet Changes Everything: WholeSecurity Launches Web Caller-ID: Industry's First Behavioral Anti-Phishing Solution, Aug. 22, 2004.*

(Continued)

*Primary Examiner* — David Y Jung
(74) *Attorney, Agent, or Firm* — Merchant & Gould (57) ABSTRACT

Anti-Phishing protection assists in protecting against phishing attacks. Any links that are contained within a message that has been identified as a phishing message are disabled. A warning message is shown when the phishing message is accessed. The first time a disabled link within the phishing message is selected a dismissible dialog box is displayed containing information about how to enable links in the message. After the user dismisses the dialog, clicking on a disabled link causes the warning message to flash drawing the user's attention to the potential severity of the problem. The links may be enabled by the user by selecting the warning message and choosing the appropriate option. Once the user enables the links, future displays of the message show the links as enabled.

20 Claims, 6 Drawing Sheets

OTHER PUBLICATIONS

GoldPhish: Using Images for Content-Based Phishing Analysis; Dunlop, M.; Groat, S.; Shelly, D.; Internet Monitoring and Protection (ICIMP), 2010 Fifth International Conference on; Publication Year: 2010, pp. 123-128.*

PhishCatch—A Phishing Detection Tool; Yu, W.D.; Nargundkar, S.; Tiruthani, N.; Computer Software and Applications Conference, 2009. COMPSAC '09. 33rd Annual IEEE International; vol. 2; Publication Year: 2009, pp. 451-456.*

A novel anti-phishing framework based on honeypots; Shujun Li; Schmitz, R.; eCrime Researchers Summit, 2009. eCRIME '09; Publication Year: 2009, pp. 1-13.*

Anonymous, "MailWasher Pro for Mac OS X and Linux Offers Users Maximum Spam Protection with Server-side Filtering Capabilities", http://www.firetrust.com/firetrustmedia.html&press_id=19, Feb. 23, 3005, 3 pgs.

Anonymous, "DSL Extreme Extends Anti-Phishing Protection to Customers; Cutting Edge Feature Helps Protect Customers from Email Scams and Identity Theft", http://www.dsldailynews.com/publications/page682-2022659.asp, May 5, 2005, 2 pgs.

Anonymous, "Message Level: Products", http://www.messagelevel.com/products.cfm, last accessed Jun. 2, 2005, 5 pgs.

Anonymous, "Email Defense: anti-Spam and anti-Virus protection for your email", http://www.luxsci.com/extranet/info/email-guard1.html, last accessed Jun. 2, 2005, 12 pgs.

Anonymous, "Tumbleweed Email Firewall™", http://www.tumbleweed.com/pdfs/tmwd_brochure_emailfirewall.pdf, last accessed Jun. 2, 2005, 4 pgs.

Anonymous, "SpamCatcher 4 Improves Anti-Phishing, Spam Protection", http://castlecops.com/article5608.html, last accessed Sep. 28, 2005, 2 pgs.

Anonymous, "Postini Threat Prevention-Block Spam-Spam Protection-Spam Stop-Spam Filters", http://www.vel.net/postini-block-spam-protection.cfm, last accessed Sep. 28, 2005, 3 pgs.

Office Action mailed Sep. 21, 2010, in Chinese Patent Application No. 200680029287.4, w/Translation.

* cited by examiner

ANTI-PHISHING PROTECTION

BACKGROUND

Phishing attacks can steal personal identity data and financial account credentials from unsuspecting users. Phishers send spoofed emails with links that lead the users to unsafe websites. The unsafe website may either be designed to trick users into divulging financial data such as credit card numbers, account usernames, passwords and social security numbers or they may be designed to download malicious code onto the user's machine that captures the personal information directly. Phishing emails are hard to identify since phishers take pains to make their emails appear genuine. The emails often closely mimic recognizable emails sent out routinely by legitimate organizations such as banks, credit card companies, and the like. These emails often convince users to select links included within the email which lead the user to divulging their personal information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Anti-Phishing protection assists in protecting users from phishing attacks. Messages that have been identified as a phishing message are marked and the links that are contained within the message are disabled. When a phishing message is accessed, a phishing warning message is shown to the user informing them that the links within the message have been disabled since the links may connect to unsafe sites. The first time a disabled link is selected within the phishing message a dismissible dialog box is displayed containing information about how to enable the disabled links in the message. Once the user dismisses the dialog, selecting one of the disabled links causes the phishing warning message to flash drawing the user's attention to the warning message. The user can then choose to enable links. Once the user enables the links within the message, future accesses to the message will show the links as enabled.

DETAILED DESCRIPTION

Figure 1:
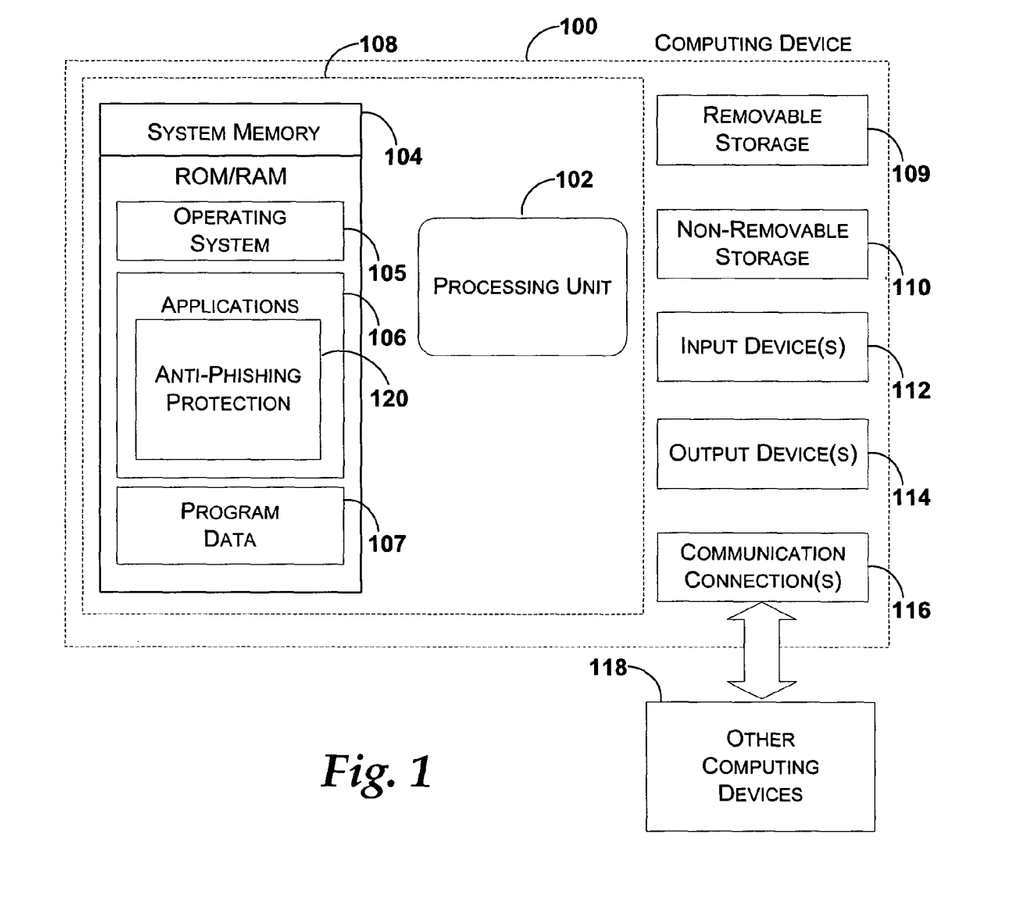
FIG. 1 illustrates an exemplary computing device.
Figure 2:
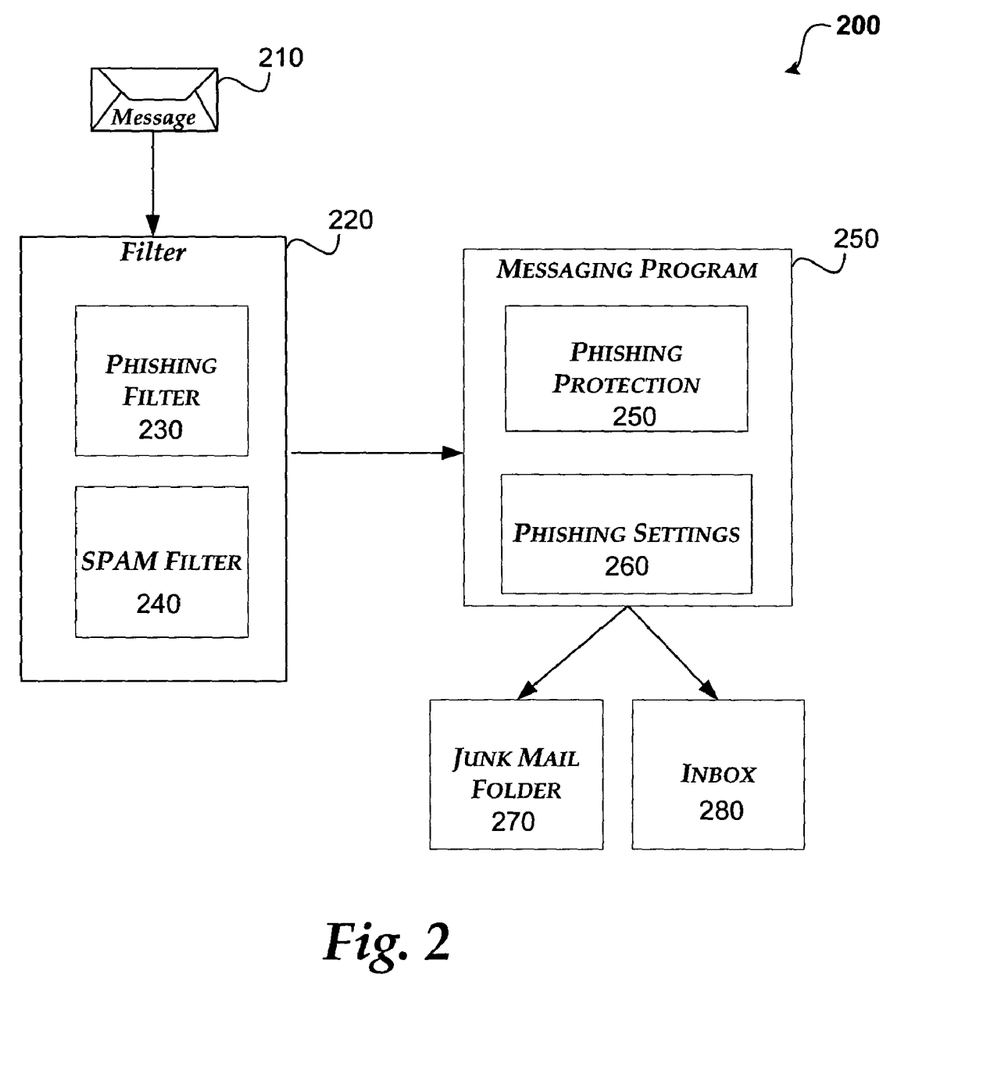
FIG. 2 illustrates an anti-phishing protection system.

FIG. 2 illustrates an anti-phishing protection system, in accordance with aspects of the invention. As illustrated, system 200 includes message 210, filter 220 including phishing filter 230 and spam filter 240, messaging program 250 including phishing protection 250 and phishing settings 260 and junk mail folder 270 and inbox 280. This system may be implemented using a computing device, or computing devices, such as the one described in conjunction with FIG. 1.

While receiving spam messages may be inconvenient, it is not typically harmful or costly to a user. Generally, the worst that can happen with a spam message is that the user needs to delete the unsolicited mail. Most spam messages are relatively easy for the user to identify since it's easy to take a quick look at the message and make a judgment.

Phishing attacks, however, can result in a user divulging sensitive information including financial information that can result in a loss of privacy and/or money. An unsuspecting user following a phishing link (URL) within a message can result in many harmful situations. The user can be directed to a site that mimics a legitimate site where they are prompted to enter confidential financial information. The user may be directed to a site that downloads malicious code onto their machine. These situations are much more dangerous than the effects of spam. Phishing messages are therefore treated differently from spam messages.

Message 210 may be any message. According to one embodiment, message 210 is an email message. A determination is initially made as to whether a message (210) is a phishing message. A phishing message is any message that could be classified as a potential phishing attack.

Message 210 is filtered by a phishing filter (230) to indicate whether or not the message is a phishing message. Any phishing detection method may be used to determine whether or not a message is a phishing message. One method that may be used to determine phishing messages is examining the formatting of the URLs contained within the message. For example, some URLS may be numeric URLs which may raise suspicion of the message. According to one embodiment, the phishing filter (230) primarily looks at certain characteristics in URLs (within the <a/> tags) to determine the likelihood that a message is a phishing message while ignoring the rest of the message content. As mentioned above, any phishing detectin method may be used as long as it provides an indicator that identifies the message as a phishing message. According to one embodiment, phishing filter 230 provides a suspicious level and a neutral level. Any message that is marked as suspicious is considered a phishing message. Any message that is marked as neutral by phishing filter 230 is not considered a phishing message.

Every incoming message is filtered to determine if the message is a phishing message. Each message is filtered whether or not the message comes from an individual considered to be safe. For example, a message may come from a user that is included on a safe senders list. According to one embodiment, although not recommended, a user may turn off disabling of the links even if a message is considered to be a phishing message. Even when this option is turned off, every message is still filtered and marked when appropriate as a phishing message such that if the user turns this option back on the message will be displayed with the links disabled.

Once the message (210) has been filtered, messaging program 250 receives the message with the indication of whether the message is a phishing message. Phishing protection 250 marks the message and disables any links within any message that has been determined to be a phishing message. The message is then delivered to a junk mail folder (270) or an inbox (280) depending on whether the message was determined by spam filter 240 to be spam. Messages determined to be spam are delivered to the junk mail folder. A message that is not considered spam, but is considered to be a phishing message, is delivered to the inbox (280).

Instead of disabling links and images together, the links and images contained within a message are disabled independently. Generally, images are blocked from external sources to prevent someone from identifying an active e-mail account. Identifying whether or not an account is active is less dangerous than a user clicking on a phishing link.

Any message that has been marked as a phishing message will have the links within it disabled. This is true regardless of whether the phishing message is delivered to a junk mail folder (270) or an inbox (280). According to one embodiment, any message considered spam will have its links disabled. Should this message be moved to the inbox, the links will remain disabled depending on the results produced by the phishing filter.

Figure 3:
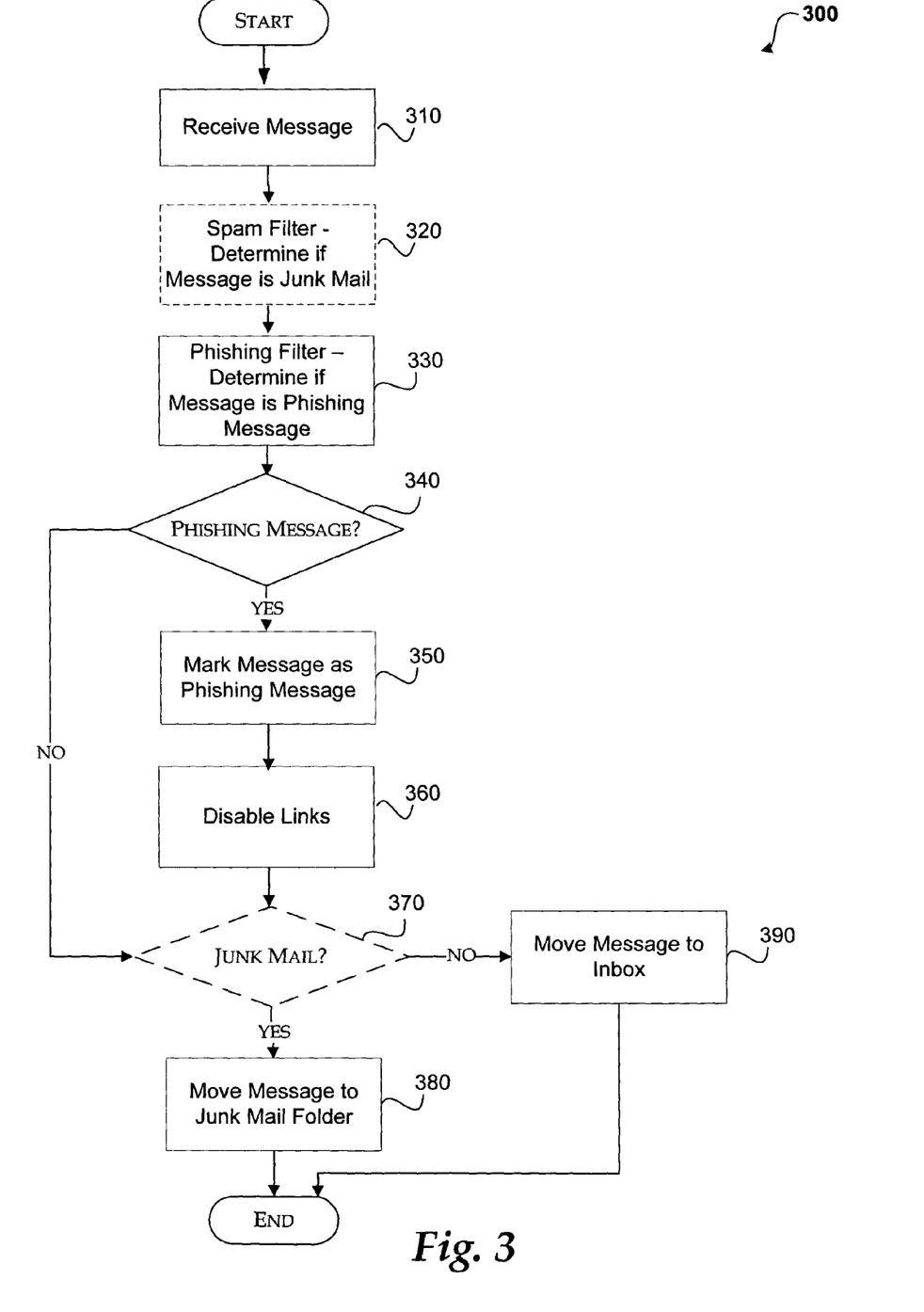
FIG. 3 shows a process for anti-phishing protection.

FIG. 3 shows a process for anti-phishing protection, in accordance with aspects of the invention. After a start block, the process flows to block 310 where a message is received. According to one embodiment, the message is an email message.

Flowing to optional block 320, the message is passed through a spam filter to determine whether or not the message is junk mail.

Moving to block 330, the message is passed through a phishing filter to determine whether or not the message is a phishing message. A phishing message is any message that is considered to include a potential phishing attack. According to one embodiment, a message will be determined to be a phishing message by examining the links that are included within the message.

Transitioning to decision block 340, a determination is made as to whether or not the message is a phishing message. When the message is not a phishing message the process flows to decision block 370.

When the message is a phishing message, the process flows to block 350 where the message is marked with an indicator showing that the message is a phishing message. The mark indicating that the message is a phishing message is stored with the message such that when it is accessed it may readily be determined that the message is a phishing message.

Moving to block 360, links within the phishing message are disabled such that a link may be inadvertently selected and direct the user to a phishing attack. According to one embodiment, every link within the message is disabled. This includes graphics that are selectable as well as URLs. According to one embodiment, an option may be set to never disable the links within the message. In this instance, the message is still filtered and marked as phishing. In this way, if the user turns back on the phishing protection the links will automatically disabled without having to refilter the message.

At optional decision block 370, a determination is made as to whether the message is junk mail. When the message is junk mail the process moves to block 380 where the message is moved to the junk mail folder. When the message is not junk mail the process moves to block 390 where the message is moved to the inbox. The process then moves to an end block and returns to processing other actions.

Figure 4:
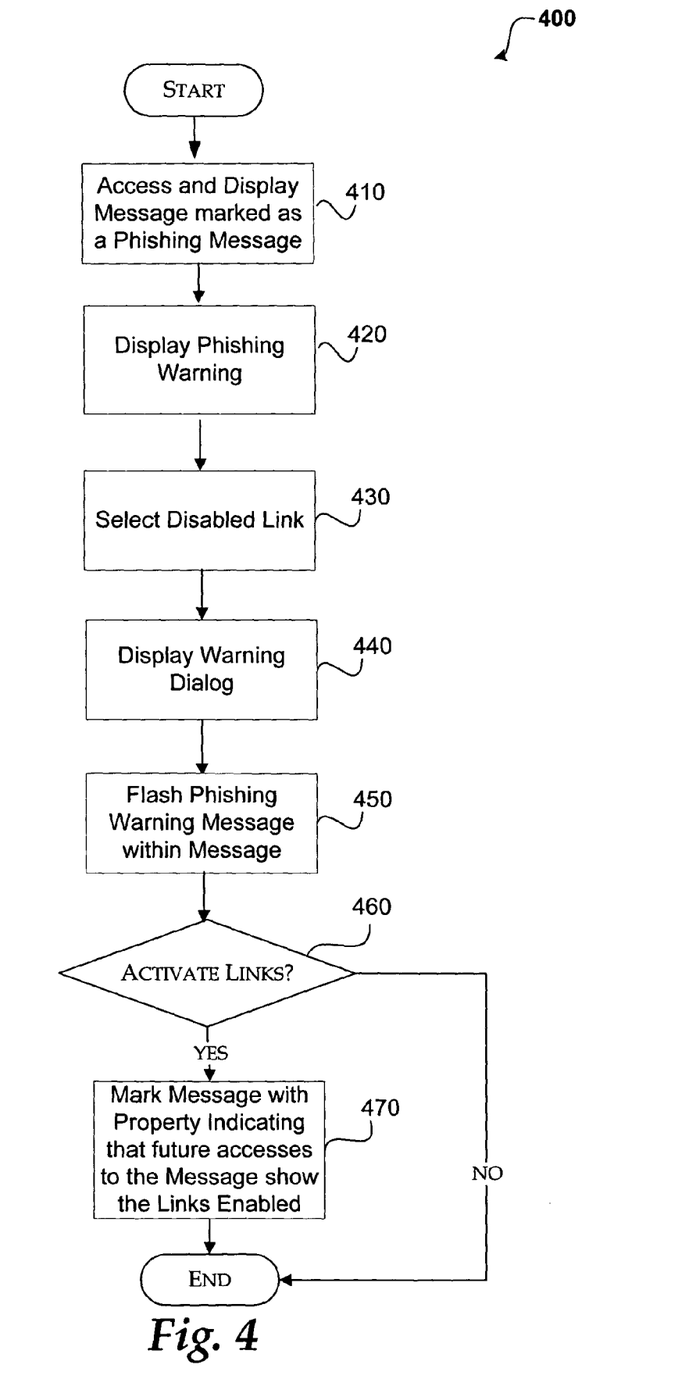
FIG. 4 illustrates a process for interacting with a phishing message.

FIG. 4 illustrates a process for interacting with a phishing message, in accordance with aspects of the present invention. After a start block, the process flows to block 410 where the message that has been marked as a phishing message is accessed. According to one embodiment, accessing the phishing message includes displaying the message.

Moving to block 420, a phishing warning is displayed along with the message. The phishing warning provides an indication to the user that due to security concerns links within the message have been disabled. According to one embodiment, the phishing warning is displayed above the message within a message display area. The warning may be displayed in many different ways. For example, a warning message may hover over the message.

Flowing to block 430, a disabled link within the phishing message is selected. For example, a user may select one of the links within the message such that they are directed to a network location specified by the disabled URL.

Transitioning to block 440, a warning dialog is displayed to the user. According to one embodiment, the warning dialog is a dismissible dialog that informs the user that at least some of the links within the message may be unsafe. The user may dismiss the warning dialog.

Moving to block 450, the phishing warning is flashed to draw attention to the severity of the potential phishing attack whenever a disabled link is selected. According to one embodiment, the phishing message is flashed at a predetermined rate and each time the warning flashes the color of the warning changes.

Flowing to decision block 460, a determination is made as to whether the links within the message are to be activated. The links may be enabled on a message by message basis. When the links are activated, the process flows to block 470 where the message is marked with an additional property that indicates that all future accesses to this message will show the links enabled within the message.

The process then moves to an end block and returns to processing other actions.

Figure 5:
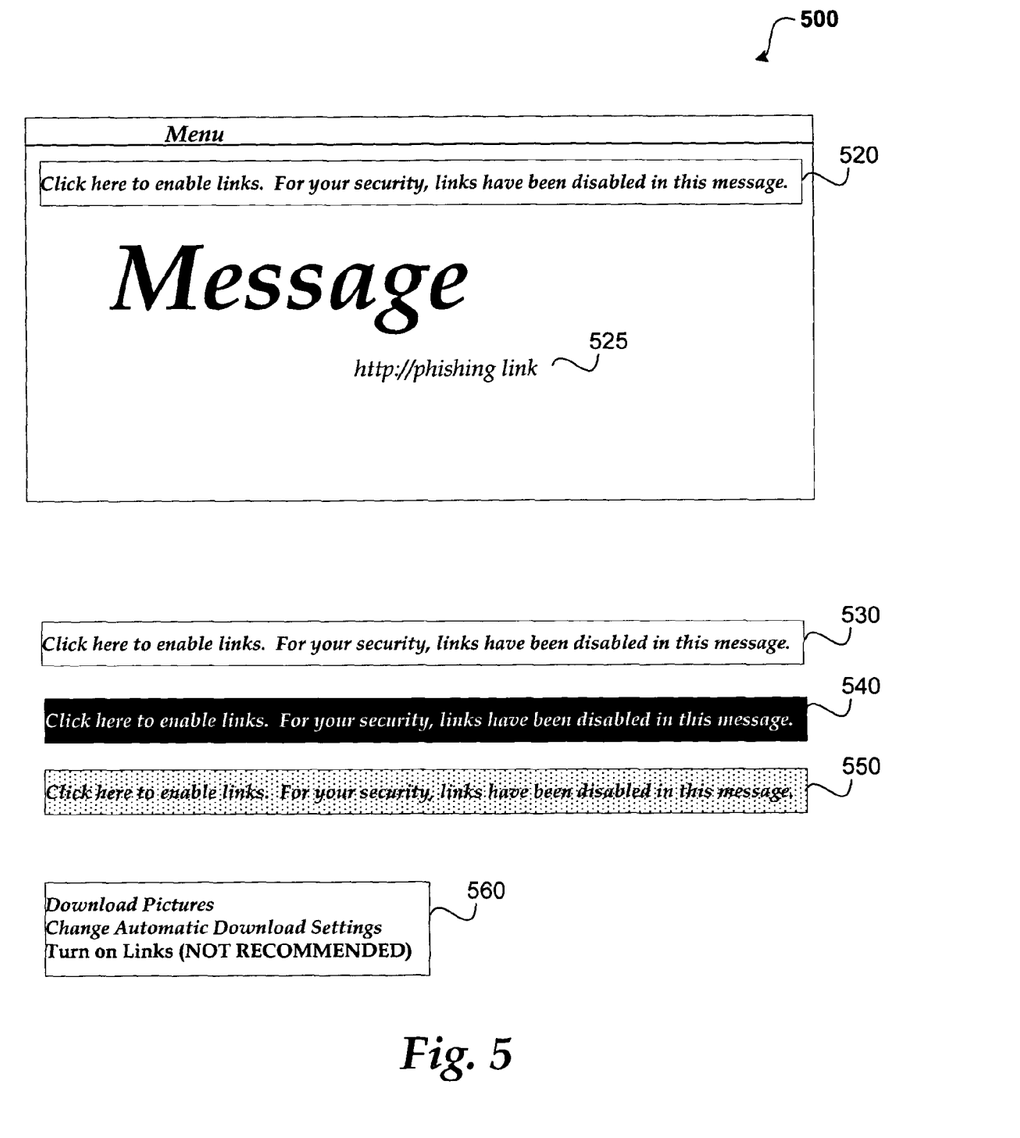
FIG. 5 shows an exemplary display of a phishing message.

FIG. 5 shows an exemplary display of a phishing message, in accordance with aspects of the invention.

Display 500 includes a phishing warning message (520) and the message containing a disabled link (525). According to one embodiment, the link (525) appears to be grayed out as compared to the display of active links.

When a message is first accessed by the message program, the message checks the indicator that has been marked on the message to determine if the message is a phishing message. At this point any links (525) within the phishing message are disabled and phishing warning 520 is displayed.

According to one embodiment, phishing warning 520 includes a message stating: "Click here to enable links. For your security, links have been disabled in this message."

When a disabled link (525) is selected the phishing warning (520) blinks at a predetermined rate to draw attention. According to one embodiment, the first time a disabled link is accessed a warning dialog is presented (See FIG. 6 and related discussion). According to another embodiment, the phishing warning (520) toggles between phishing warning message 530, phishing warning message 540 and phishing warning message 550. Not only does the warning flash, the colors may be changed drawing further attention to the warning.

The user may select phishing warning 520 to enable the links within the message. Selecting the phishing warning message displays context menu 560. Selecting the "Turn on links (NOT RECOMMENDED)" enables all links in the message. At this point, the Turn on Links menu item is removed from menu 560. Once the links are enabled they will remain enabled whenever the message is reopened.

Figure 6:
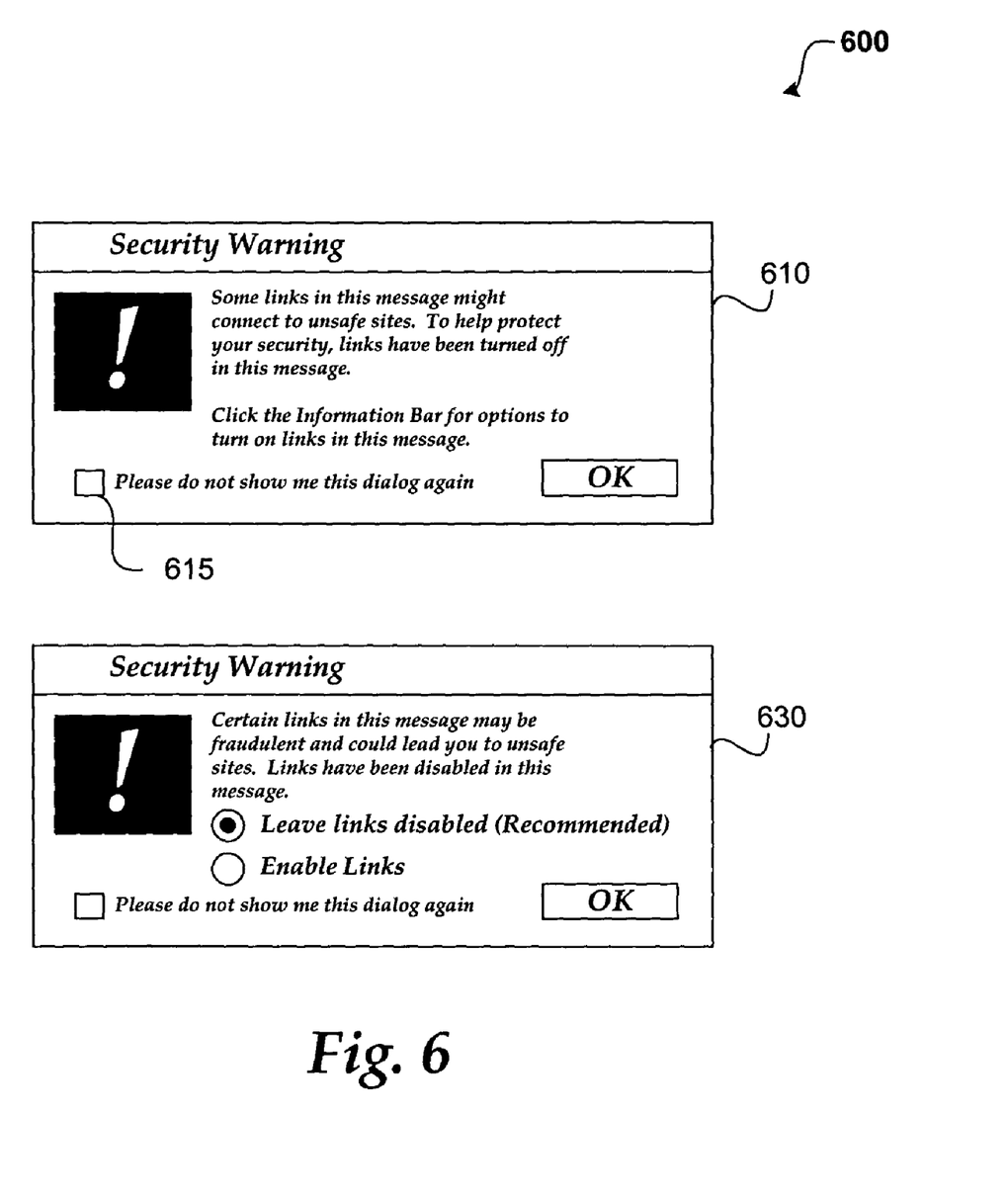
FIG. 6 illustrates exemplary phishing dialogs, in accordance with aspects of the present invention.

FIG. 6 illustrates exemplary phishing dialogs, in accordance with aspects of the invention.

When the user first selects a disabled URL, such as link 525 shown in FIG. 5, warning dialog 610 is displayed. Warning dialog 610 is an informational dialog that lets the user know why a link was disabled and how to enable links for the message. If the user selects the "Please do not show me this dialog again" checkbox 615 then the dialog is no longer displayed upon subsequent selection of links within the message.

Optional warning dialog 630 may be displayed to ensure that the user realizes the importance of the warning. For example, dialog 630 may be a secondary dialog box that is displayed after the user selects to turn on the links using context menu 560 displayed in FIG. 5.

Illustrative Operating Environment

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a getting started program 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method executing on a computing device for protecting against phishing attacks, comprising:
   receiving a message, wherein the message includes at least one link that when selected attempts to access an external source;
   determining when the received message is a phishing message;
   disabling the at least one link and any other links within the message that is determined to be a phishing message; wherein the links within the phishing message are disabled before they are selected; and
   displaying the phishing message that includes a visible indication that the links within the phishing message are disabled.

2. The method of claim 1, further comprising marking the message as a phishing message.

3. The method of claim 2, further comprising marking the message with a property such that when the message is accessed again, the links within the message are displayed as enabled.

4. The method of claim 1, further comprising displaying the phishing message with the links disabled and displayed grayed out.

5. The method of claim 4, further comprising displaying a phishing warning message indicating that the message has been determined to be a phishing message.

6. The method of claim 4, further comprising determining when a disabled link is selected, and in response to the selection, displaying a warning box indicating that the link may be unsafe.

7. The method of claim 5, further comprising receiving an indication to enable the disabled links and in response to indication, flashing the phishing warning message at a predetermined rate.

8. The method of claim 7, further comprising alternating between at least two colors within the flashing phishing warning message.

9. The method of claim 5, further comprising determining when the phishing warning message is selected and in response to the selection determining whether to enable the disabled links within the message.

10. The method of claim 9, further comprising displaying a secondary warning dialog in response to the indication to enable the disabled links.

11. A computer-readable medium having computer-executable instructions that are executed on a computing device for protecting against phishing attacks, comprising:
    accessing a phishing message;
    disabling any links within the phishing message; wherein the links within the phishing message are disabled before they are selected; and
    displaying the phishing message with a visible indication that the links within the phishing message are disabled.

12. The computer-readable medium of claim 11, further comprising displaying the phishing message with the links grayed out that indicates that the links are disabled and displaying a phishing warning message.

13. The computer-readable medium of claim 12, further comprising determining when a disabled link is selected, and in response to the selection, displaying a warning.

14. The computer-readable medium of claim 11, further comprising receiving an indication to enable the disabled links and in response to indication, flashing the phishing warning message at a predetermined rate.

15. The computer-readable medium of claim 14, further comprising determining when the phishing warning message is selected and in response to the selection determining whether to enable the disabled links within the message.

16. The computer-readable medium of claim 15, further comprising marking the message with a property such that when the message is accessed again, the links within the message are shown enabled.

17. A system for protecting against phishing attacks, comprising:

a processor and a computer-readable medium;

a filter using the processor that is configured to:

receive a message that includes a link;

determine whether the message is a phishing message by examining characteristics within tags of the link; and provide an indication that the message is a phishing message; and a messaging program using the processor that is coupled to the filter and that is configured to:

receive the message and the indication;

disable the link within the message when the indication shows the message to be a phishing message; wherein the link within the phishing message is disabled before being selected; and displaying the phishing message with a visible indication that the link within the phishing message is disabled.

18. The system of claim 17, further comprising marking the message as a phishing message when indicated such that whenever the message is displayed with the mark indicating that the message is a phishing message the links are disabled.

19. The system of claim 17, further comprising marking the message with a property such that when the message is accessed the links within the message are enabled.

20. The system of claim 17, further comprising activating the links for a message after a warning dialog is dismissed and an option has been selected to enable the links.

* * * * *